United States Patent [19]

Wilson

[11] 4,379,319
[45] Apr. 5, 1983

[54] MONOLITHIC CERAMIC CAPACITORS AND IMPROVED TERNARY CERAMIC COMPOSITIONS FOR PRODUCING SAME

[75] Inventor: James M. Wilson, Victor, N.Y.

[73] Assignee: Ferro Corporation, Cleveland, Ohio

[21] Appl. No.: 349,849

[22] Filed: Feb. 18, 1982

[51] Int. Cl.³ .................... C04B 35/00; H01G 4/12
[52] U.S. Cl. .................................. 361/321; 501/134
[58] Field of Search .................... 501/134; 361/321

[56] References Cited

U.S. PATENT DOCUMENTS

| | | | |
|---|---|---|---|
| 4,078,938 | 3/1978 | Yonezawa | 501/134 |
| 4,236,928 | 12/1980 | Yonezawa et al. | 501/134 |
| 4,308,571 | 12/1981 | Tanei et al. | 361/321 |

FOREIGN PATENT DOCUMENTS

| | | | |
|---|---|---|---|
| 54-146812 | 11/1979 | Japan | 501/134 |
| 54-159697 | 12/1979 | Japan | 501/134 |

OTHER PUBLICATIONS

Manual–"Understanding Chip Capacitors", pp. 1–25, Pub'd. by Johanson Dielectrics Inc., Burbank, Calif.

Primary Examiner—Helen M. McCarthy
Attorney, Agent, or Firm—Shlesinger, Fitzsimmons & Shlesinger

[57] ABSTRACT

A multi-layer ceramic capacitor is prepared from a novel ceramic composition produced from the oxides of lead (PbO), iron ($Fe_2O_3$), niobium ($Nb_2O_5$), nickel (NiO), and tungsten ($WO_3$), or the synthesized compounds $Pb(Fe_{\frac{1}{2}}Nb_{\frac{1}{2}})O_3$, $Pb(Fe_{\frac{2}{3}}W_{\frac{1}{3}})O_3$ and $Pb(Ni_{\frac{1}{3}}Nb_{\frac{2}{3}})O_3$, together with a small quantity of a $Mn(NO_3)_2$ solution to improve certain electric properties of the capacitor. When used in the correct proportions the oxides disclosed herein are capable of producing monolithic ceramic capacitors having Z5U ratings. In particular, the lead, nickel, niobate compound tends to flatten and to lower the curie peak for the ceramic composition.

3 Claims, 4 Drawing Figures

MONOLITHIC CERAMIC CAPACITORS AND IMPROVED TERNARY CERAMIC COMPOSITIONS FOR PRODUCING SAME

BACKGROUND OF THE INVENTION

This invention relates to improved monolithic ceramic capacitors, and to improved ceramic dielectric compositions for making such capacitors. Even more particularly, this invention relates to an improved ternary ceramic composition which exhibits a high dielectric constant, low sintering temperature, and useful dielectric constant temperature characteristics, and which is particularly suited for use in making monolithic ceramic capacitors having a Z5U rating.

As is well known by those skilled in the art, ceramic dielectric compositions consisting essentially of $BaTiO_3$ modified with stannates, zirconates and titanates of alkaline earth metals are high dielectric constant materials that have been widely employed in the manufacture of monolithic capacitors. However, these compositions must be sintered at relatively high temperatures, e.g., in the range of 1300°–1400° C. These conditions require the use of electrode materials with high melting points, good oxidation resistance at elevated temperatures, minimal tendency to react with the ceramic dielectric during the sintering process, and sinterability at the maturation temperature of the dielectric. Due to these requirements the choices for electroding materials have been restricted to precious metals, such as for example platinum, palladium or combinations thereof.

Significant savings in electroding costs for capacitors of the type described could be realized if dielectric materials were sintered at temperatures below 1000° C., and preferably below 960° C. This would enable the use of less expensive metals such as silver, oxygen-retarding nickel alloys, and the like. Recent advancements in the art have suggested the use of $BaTiO_3$ based ceramic dielectrics which can be sintered in the 1000° C. area by incorporating a low melting liquid phase. These systems, however, often result in compositions having low dielectric constants (e.g. less than 4000) due to the low dielectric constant grain boundary phases formed from the low melting component. As a result, an increased number of metal electrode layers may be necessary to achieve a given capacitance value in a monolithic capacitor. It can easily be seen, therefore, that it would be most advantageous to retain dielectric properties, such as a high dielectric constant, in order fully to realize savings in electroding costs.

U.S. Pat. No. 4,078,938 has suggested using lead-ferrous-tungstate and lead-ferrous-niobate compounds for producing ceramic compositions that have low sintering temperatures and high dielectric constants, but the disadvantage of such compositions is that they cannot be used to produce satisfactory monolithic capacitors that also meet the Z5U rating of the U.S. Electronics Industries Association (EIA) Standard—i.e., a temperature coefficient range of +22% to −56% at an operating temperature range of +10° C. to +85° C. and an insulation resistance of $7.5 \times 10^9$ ohms or higher.

U.S. Pat. No. 4,236,928, however, has disclosed a ternary ceramic system consisting essentially of $Pb(Fe_{\frac{2}{3}}W_{\frac{1}{3}})O_3$, $Pb(Fe_{\frac{1}{2}}Nb_{\frac{1}{2}})O_3$, and $Pb(Zn_{\frac{1}{3}}Nb_{\frac{2}{3}})O_3$ and which can be used to produce capacitors which meet the Z5U rating of the EIA. This is made possible essentially by controlling the addition of $Pb(Zn_{\frac{1}{3}}Nb_{\frac{2}{3}})O_3$. It is this latter component or additive which is responsible for modifying the curie temperature and temperature dependence of capacitance of the composition to meet various EIA standards. In general, an increase in $Pb(Zn_{\frac{1}{3}}Nb_{\frac{2}{3}})O_3$ results in an increase in the curie temperature and a decrease in temperature dependence of capacitance. The disadvantage of this system, however, is that the addition of zinc in the form of the $Pb(Zn_{\frac{1}{3}}Nb_{\frac{2}{3}})O_3$ not only tends to move the curie peak upwardly on the temperature scale of the associated TC curve, it also does little to flatten the curve.

One object of this invention, therefore, is to provide an improved ternary composition containing a compound which tends to flatten and to lower the curie peak for a ceramic composition of the type described.

It is an object also of this invention to provide an improved ternary ceramic composition which allows low temperature sintering, has a high dielectric constant, a low dielectric loss, high specific resistivity, and a temperature dependence of dielectric constant which meets Z5U rating of the EIA standard.

Another object of the present invention is to provide low temperature sintering compositions which meet EIA standards for temperature coefficient of capacitance which allow even smaller changes in capacitance vs. temperature, such as Y5R, X5S, and Z5R characteristics.

Still another object of the present invention is to provide a ceramic capacitor composition maneuvered to meet EIA standard dielectric constant vs. temperature characteristics such as Z5U, Y5R, X5S and Z5R by use of a $Pb(Ni_{\frac{1}{3}}Nb_{\frac{2}{3}})O_3$ component, in addition to $Pb(Fe_{\frac{1}{2}}Nb_{\frac{1}{2}})O_3$ and $Pb(Fe_{\frac{2}{3}}W_{\frac{1}{3}})O_3$.

Another object of the present invention is to incorporate 0.1 to 0.75 wt.% of a $Mn(NO_3)_2$ solution in the above mentioned ceramic composition to improve dielectric losses at elevated temperatures and to improve insulation resistance.

It is also an object of the present invention to provide improved, multilayer ceramic capacitors which utilize the low temperature sintering dielectric composition and lower cost, high-silver-content buried electrodes.

SUMMARY OF THE INVENTION

The present invention provides a multilayer ceramic capacitor produced from a novel dielectric composition consisting essentially of $[Pb(Fe_{\frac{1}{2}}Nb_{\frac{1}{2}})O_3]x$ $[Pb(Fe_{\frac{2}{3}}W_{\frac{1}{3}})O_3]y$ and $[Pb(Ni_{\frac{1}{3}}Nb_{\frac{2}{3}})O_3]z$, where the respective proportions $x+y+z=1.0$, and modified by an addition of $Mn(NO_3)_2$ solution to improve specific electric properties. In a preferred embodiment the respective proportions of x, y, and z are limited to the ranges of $0.55 \leq X \leq 0.70$, $0.01 \leq Y \leq 0.36$, and $0.07 \leq Z \leq 0.32$.

After calcining, these compositions can be sintered at between 850° and 950° C. They have reduced temperature dependence of dielectric constant, and their dielectric constant is held generally at a high value. Thus the ceramic materials of the present invention can meet Z5U rating. The use of $Mn(NO_3)_2$, rather than the oxide or carbonate compounds of manganese, provides higher resistivities and lower loss values v. temperature, than equal additions of $Mn^{+2}$ ions from the latter compounds.

Figure 1:
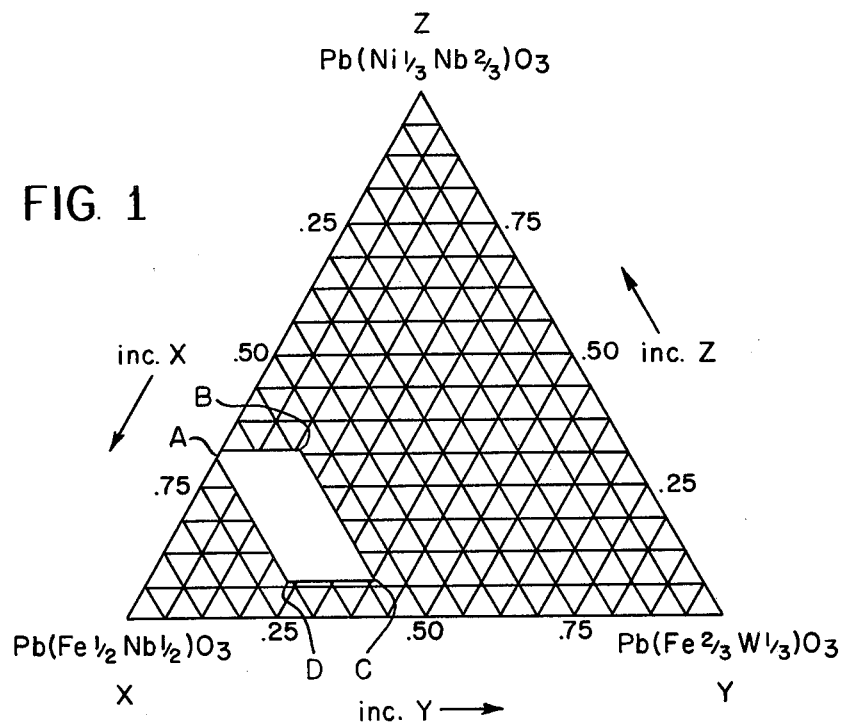
FIG. 1 is a ternary compositional diagram representing the range of ceramic compositions as used in this invention.

DETAILED DESCRIPTION OF THE PREFERRED EMBODIMENTS blended powder. The material was then calcined at 750° C.–800° C. for a period of two hours in a covered vessel.

The calcined material was again pulverized and wet milled to a particle size of =2.0 um as measured by a model TaII Coulter Counter. A 5% by weight addition of polyvinyl alcohol solution was added as a temporary binder for molding test samples with the aid of a 4 ton double action press. Sample disc made from this molded material, and measuring approximately 0.035″ × 0.50″ were sintered over a range of temperatures from 850°–925° C. for two hours. Inverted crucibles were employed to minimize possible PbO vapor loss and to insure a PbO rich atmosphere. Silver electrodes were attached by baking. Properties of ceramic compositions obtained in this manner are shown in Table I as follows:

TABLE I

| Sample No. | Composition (mole ratios) | | | $Mn(NO_3O_2$ Wt. % | Sintering Temp. °C. | Dielectric Constant | Dissipation Factor % | Temperature Coefficient of Dielectric Constant | | | | | Insulation R in Ω at 500 VDC |
|---|---|---|---|---|---|---|---|---|---|---|---|---|---|
| | X | Y | Z | | | | | −55° C. | −30° C. | +10° C. | +85° C. | +125° C. | |
| 1 | .56 | .36 | .08 | 0 | 860 | 8135 | 4.54 | | −20.8 | +20.9 | −17.2 | | 1 × 10^7 |
| 2 | .56 | .36 | .08 | 0 | 875 | 6758 | 1.27 | −38.2 | −18.7 | +17.6 | −52.8 | | 1.8 × 10^9 |
| 3 | .56 | .36 | .08 | 0 | 888 | 7571 | 1.65 | | −26.7 | +24.7 | −46.9 | | 1.4 × 10^8 |
| 4 | .56 | .36 | .08 | 0 | 900 | 9181 | 1.14 | | −28.9 | +24.0 | −49.6 | | 8 × 10^8 |
| 5 | .56 | .36 | .08 | .1 | 850 | 8633 | 1.51 | | +0 | +25.2 | −59.7 | | 1.3 × 10^9 |
| 6 | .56 | .36 | .08 | .1 | 860 | 8571 | .89 | | −3.6 | +26.0 | −64.5 | | 2 × 10^10 |
| 7 | .56 | .36 | .08 | .1 | 875 | 8974 | .54 | | −10.1 | +22.8 | −61.9 | | 2.6 × 10^10 |
| 8 | .56 | .36 | .08 | .1 | 888 | 8067 | 2.04 | | −14.9 | +30.7 | −61.7 | | 4 × 10^10 |
| 9 | .56 | .36 | .08 | .1 | 900 | 8719 | 1.74 | | −23.5 | +23.2 | −63.0 | | 2 × 10^10 |
| 10 | .56 | .36 | .08 | .25 | 850 | 6877 | 2.57 | | −17.1 | +19.1 | −62.2 | | 1.1 × 10^10 |
| 11 | .56 | .36 | .08 | .25 | 875 | 8821 | .83 | | −26.7 | +14.0 | −64.4 | | 1 × 10^11 |
| 12 | .56 | .36 | .08 | .25 | 900 | 6586 | .39 | −10.3 | | +9.9 | −58 | | 7.5 × 10^10 |
| 13 | .56 | .36 | .08 | .25 | 925 | 5322 | 1.57 | | −39.8 | +7.6 | −53.9 | | 1.3 × 10^10 |
| 14 | .62 | .30 | .08 | .1 | 850 | 8310 | 6.8 | | −41.9 | +17.7 | −60.6 | | 7 × 10^8 |
| 15 | .62 | .30 | .08 | .1 | 875 | 10226 | 1.0 | | −50.7 | +8.7 | −60.0 | | 6 × 10^10 |
| 16 | .62 | .30 | .08 | .1 | 900 | 10151 | .60 | −67.0 | | +6.5 | −61.9 | | 3.3 × 10^10 |
| 17 | .62 | .30 | .08 | .1 | 925 | 8492 | 2.8 | | −61.0 | −.35 | −54.0 | | 1 × 10^9 |
| 18 | .65 | .27 | .08 | .1 | 860 | 9916 | .59 | | −57.7 | −4.0 | −61.7 | | 3.2 × 10^10 |
| 19 | .65 | .27 | .08 | .1 | 875 | 10027 | .66 | | −57.3 | −2.57 | −60.2 | | 2.3 × 10^10 |
| 20 | .65 | .27 | .08 | .1 | 888 | 10704 | .92 | | −62.1 | −5.94 | −60.8 | | 9 × 10^10 |
| 21 | .65 | .27 | .08 | .1 | 900 | 11750 | .42 | | −66.7 | −12.7 | −64.0 | | 1.5 × 10^11 |
| 22 | .65 | .27 | .08 | .25 | 860 | 5972 | .55 | | −53.4 | −11.2 | −49.0 | | 8.5 × 10^10 |
| 23 | .65 | .27 | .08 | .25 | 875 | 7200 | .60 | | −54.3 | −8.99 | −49.0 | | 1.3 × 10^11 |
| 24 | .65 | .27 | .08 | .25 | 888 | 7334 | .76 | | −60.5 | −14.6 | −51.4 | | 1.4 × 10^11 |
| 25 | .65 | .27 | .08 | .25 | 900 | 9150 | 1.22 | | −70.0 | −18.4 | −59.0 | | 1.1 × 10^10 |
| 26 | .65 | .27 | .08 | .50 | 860 | 7895 | 1.68 | | −57.0 | −6.1 | −56.9 | | 9 × 10^11 |
| 27 | .65 | .27 | .08 | .50 | 875 | 9773 | .9 | | −60.3 | −12.3 | −58.8 | | 1.6 × 10^11 |
| 28 | .65 | .27 | .08 | .50 | 888 | 9402 | .94 | | −59.6 | −12.0 | −58.4 | | 1.5 × 10^11 |
| 29 | .65 | .27 | .08 | .50 | 900 | 5957 | .63 | | −65.9 | −20.2 | −54.8 | | 1.3 × 10^11 |
| 30 | .65 | .27 | .08 | .75 | 875 | 3157 | .90 | | −51.2 | −15.7 | −33.3 | | 4 × 10^10 |
| 31 | .65 | .27 | .08 | .75 | 900 | 3780 | .85 | | −61.0 | −21.2 | −44.0 | | 9.5 × 10^10 |
| 32 | .67 | .21 | .12 | .1 | 875 | 10545 | .76 | | −61.4 | −4.68 | −52.5 | −61.1 | 2 × 10^10 |
| 33 | .67 | .21 | .12 | .1 | 900 | 9511 | 1.15 | | −66.8 | −16.8 | −51.9 | | 4 × 10^9 |
| 34 | .69 | .15 | .16 | .1 | 875 | 6093 | 1.26 | −62.0 | −54.3 | −13.9 | −32.8 | −51.1 | 4 × 10^9 |
| 35 | .69 | .15 | .16 | .1 | 900 | 6163 | 1.37 | | −59.4 | −20.8 | −38.7 | | 2.1 × 10^10 |
| 36 | .67 | .01 | .32 | .1 | 875 | 1557 | 2.07 | −18.2 | −12.9 | −1.3 | −13.4 | −22.9 | 1 × 10^9 |
| 37 | .67 | .01 | .32 | .1 | 900 | 1621 | 1.89 | −28.1 | −16.3 | −.8 | −13.9 | −30.1 | 3 × 10^9 |
| 38 | .67 | .01 | .32 | .1 | 950 | 1636 | 1.07 | −31.7 | −23.0 | −3.3 | −19.6 | −40.2 | 1.2 × 10^11 |

*$X = Pb(Fe_{\frac{1}{2}}Nb_{\frac{1}{2}})O_3$
$Y = Pb(Fe_{\frac{2}{3}}W_{\frac{1}{3}})O_3$
$Z = Pb(Ni_{\frac{1}{3}}Nb_{\frac{2}{3}})O_3$ The novel ceramic composition disclosed herein may be formulated from the oxides of lead (PbO), iron ($Fe_2O_3$), niobium ($Nb_2O_5$), nickel (NiO), and tungsten ($WO_3$), or the synthesized compounds $Pb(Fe_{\frac{1}{2}}Nb_{\frac{1}{2}})O_3$, $Pb(Fe_{\frac{2}{3}}W_{\frac{1}{3}})O_3$ and $Pb(Ni_{\frac{1}{3}}Nb_{\frac{2}{3}})O_3$.

Referring to the test samples listed on the following TABLE I, the ternary forming materials and the manganese nitrate additive for each sample were weighed and then wet mixed at 70% ceramic solids/$H_2O$ ratio in a lined porcelain jar mill containing $ZrO_2$ media. The resultant ceramic slurry was dried and pulverized in a laboratory sized micro-pulverizer to form an intimately The dielectric constant and the dissipation factor were measured at 25° C., at a frequency of 1 khz and 1 vrms. The insulation resistance R was measured at 25° C. with 500 vdc applied voltage. The temperature coefficient of dielectric constant was obtained by measuring dielectric constant at the selected test temperature ($k_t$) and calculating the change in dielectric constant from the reference value ($k_t$) at 25° C. according to the following:

$$[(k_t - k_R)/k_R] \times 100\%$$

As can be determined from Table I, it is apparent that the ternary system consisting of $Pb(Fe_{\frac{1}{2}}Nb_{\frac{1}{2}})O_3$, $Pb(Fe_{\frac{2}{3}}W_{\frac{1}{3}})O_3$, and $Pb(Ni_{\frac{1}{3}}Nb_{\frac{2}{3}})O_3$, can produce capacitor dielectric materials capable of meeting Z5U (and even more stable) temperature coefficient requirements.

It is believed that the $Mn(NO_3)_2$ is an effective oxygen donor during the sintering process and also helps in the control of the volatile PbO component during the calcining step. It is also felt that the $Mn^{+2}$ ions can act as acceptor dopants in the B site of the perovskite-type $A^{+2}(B^{3+}_{0.5}-B^{5+}_{0.5})O_3$, $A^{+2}(B^{3+}_{0.67} B^{6+}_{0.33})O_3$, and $A^{+2}(B^{2+}_{0.33} B^{5+}_{0.67})O_3$ structures formed during the calcining and sintering processes. Oxygen vacancies, which can exist, may then be neutralized by the effective double negative charge of the dopant. Formation of B sites with less than a charge of $+4$ is thus suppressed. The result is a dielectric which remains highly insulating, rather than semiconducting, which would be the case if formation of B sites with a charge of less than $+4$ were allowed to occur.

Also, due to the fact that the sintering temperature is as low as reported, lower cost, high silver content internal electrodes may be employed. The reduced electroding costs combined with the savings in power consumption of the sintering furnaces, clearly indicate that these compositions can provide substantial reductions in manufacturing costs to the capacitor manufacturer.

The proportions of X, Y, and Z are limited to the ranges of $0.55 \leq X \leq 0.70$, $0.01 \leq Y \leq 0.36$, and $0.07 \leq Z \leq 0.32$ in the present invention for the following reasons: If X is less than 0.55 the curie temperature of the ceramic material is too low and the temperature coefficient of dielectric constant at 85° C. is too high to meet the Z5U requirement. If X is greater than 0.70 the curie temperature of the ceramic material is high and the temperature coefficient of dielectric constant is high at $-30$, and variation in dielectric constant between $+10°$ C. and $+25°$ C., while not out of specification, is great and could cause loss problems in capacitors manufactured to specific tolerances (e.g. $\pm 20\%$). If Y is greater than 0.36, the amount of Z needed to shift the curie point to the room temperature area is small ($<0.07$). This results in capacitor dielectrics which are unable to meet the 85° C. requirement for temperature coefficient of dielectric constant for Z5U rating. If Z is greater than 0.32 the dielectric constant becomes low and the sintering temperature increases.

The ceramic compositions described above fall within the generally trapzoidal region denoted by the letters A,B,C,D in the ternary phase diagram as shown in FIG. 1 of the accompanying drawings.

Figure 2:
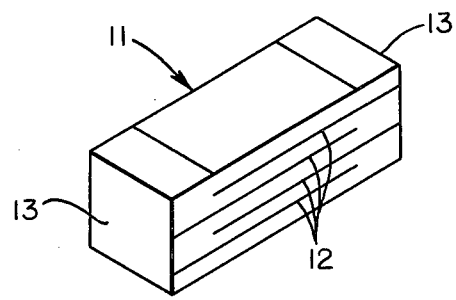
FIG. 2 is a perspective view of a ceramic multilayer capacitor fabricated according to this invention.
Figure 3:
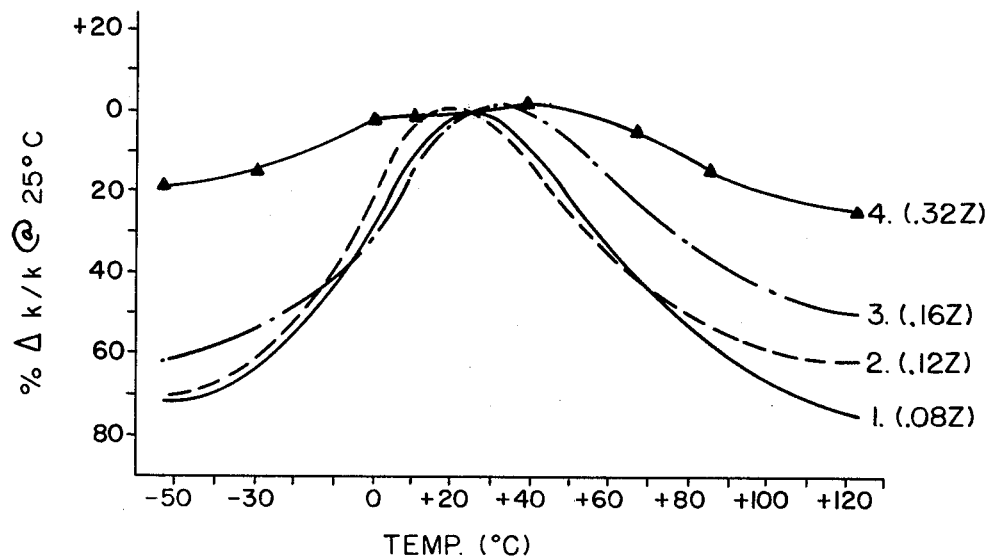
FIG. 3 illustrates graphically a plurality of TC curves which show the percent change in dielectric constant vs. temperature for various compositions made according to the present invention.
Figure 4:
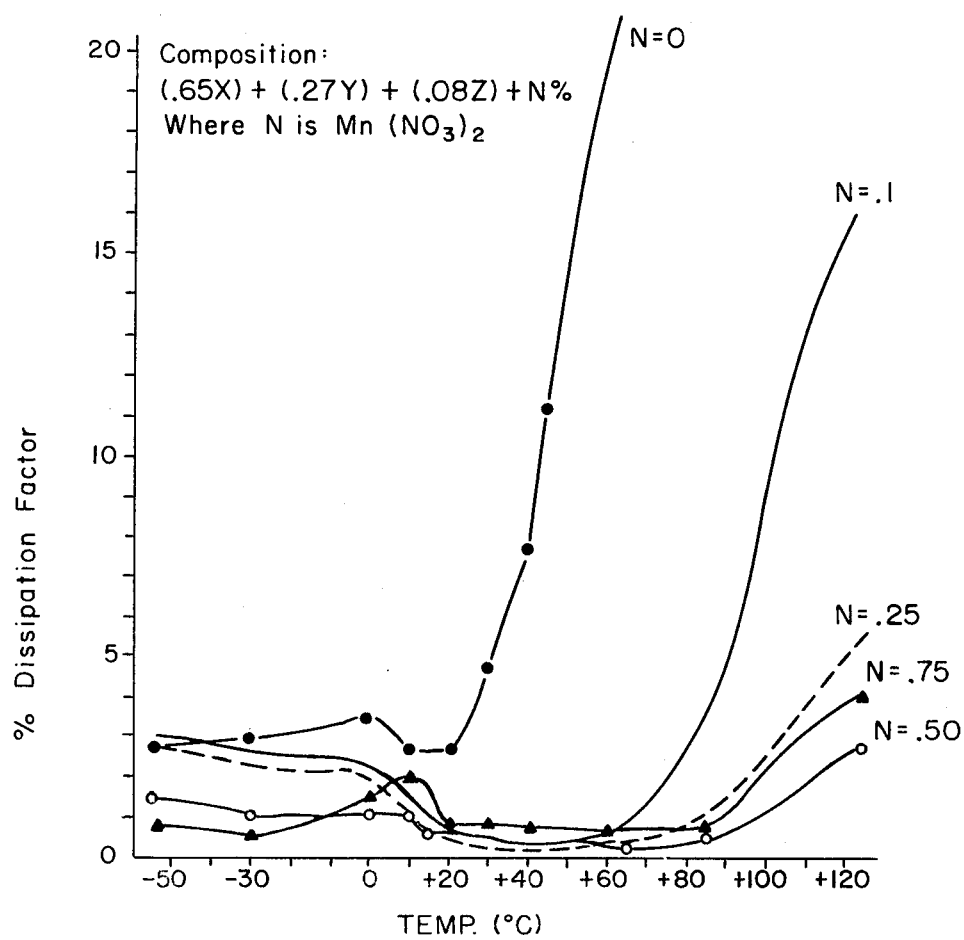
FIG. 4 illustrates graphically the result which additions of $Mn(NO_3)_2$ to the novel compositions will have on the percent dissipation factor at various temperatures.

Multilayer ceramic capacitors, such as shown by way of example at 11 in FIG. 2, where fabricated utilizing chips made from ceramic compositions according to the present invention mixed with a solvent-based acrylic binder system. Chip size was approximately $0.225'' \times 0.250''$; and fired dielectric thickness measured approximately $0.0012''$. The capacitors were manufactured with four internal electrodes 12 made from a high silver content internal electrode paste, and terminated as at 13 at opposite ends of the capacitor. Results are summarized in Table II as follows:

TABLE II

| Ceramic Composition | | | Electrode Composition | Sintering Temp. | Capacticance Ufd (25° C.) | Dissipation factor % |
|---|---|---|---|---|---|---|
| X | Y | Z | | | | |
| .65 | .27 | .08 | 20Pd/80Ag | 875° C. | 0.236 | 1.6 |
| .67 | .21 | .12 | 20Pd/80Ag | 875° C. | 0.243 | 1.7 |

| 25° C. IR megΩ/ufds 50 vdc | 80° C. IR megΩ/ufds 50 udc | % Capacitance change | |
|---|---|---|---|
| | | +10° C. | +85° C. |
| 1000 | 100 | −9.9 | −59 |
| 1000 | 100 | −43. | −54 |

The multilayer ceramic capacitor test data indicates that the composition of the dielectric material may be adjusted to meet various EIA TCC requirements (such as Z5U) by increasing the $Pb(Ni_{\frac{1}{3}}Nb_{\frac{2}{3}})O_3$ content. It can easily be seen that the use of these novel ceramic compositions, modified in the manners described herein, will be of great practical value to the manufacturer by reducing manufacturing costs while maintaining various capacitor performance levels.

While this invention has been illustrated and described in connection with only certain embodiments thereof, it will be apparent that it is capable of still further modification, and that this application is intended to cover any such modifications that may fall within the scope of one skilled in the art or the appended claims.

What is claimed is:

1. A ceramic composition capable of producing capacitors having a temperature coefficient range of $+22\%$ to $-56\%$ at an operating temperature range of $+10°$ C. to $+85°$ C., and an insulation resistance of $7.5 \times 10^9 \Omega$ or higher, and consisting essentially of $[Pb(Fe_{\frac{1}{2}}Nb_{\frac{1}{2}})O_3]X$, $[Pb(Fe_{\frac{2}{3}}W_{\frac{1}{3}})O_3]Y$ and $[Pb(Ni_{\frac{1}{3}}Nb_{\frac{2}{3}})O_3]Z$, and from 0.1 to 0.75 wt.% $Mn(NO_3)_2$, where $X+Y+Z=1.0$, and the proportions of X, Y, and Z fall within the ranges of about:

$0.55 \leq X \leq 0.70$,
$0.15 \leq Y \leq 0.36$, and,
$0.07 \leq Z \leq 0.32$.

2. A ceramic composition as claimed in claim 1, wherein the proportions of X, Y and Z fall within the generally trapezoidal region denoted by the letters A, B, C and D on the ternary phase diagram shown in FIG. 1 of the accompanying drawings, and wherein Y is $\geq 0.15$ mole percent.

3. A multilayer ceramic capacitor made from a ceramic composition of the type claimed in claim 1.

* * * * *